United States Patent
Serex et al.

(10) Patent No.: US 6,532,079 B1
(45) Date of Patent: Mar. 11, 2003

(54) METHOD FOR PROCESSING IMAGES AND DEVICE FOR IMPLEMENTING SAME

(75) Inventors: Patrick Serex, Vesenaz (CH); Alan Tawil-Kummerman, Vesenaz (CH); Daniel Cerutti, Collonge-Sous-Saleve (FR)

(73) Assignee: Fotowire Development SA, Geneva (CH)

( * ) Notice: Subject to any disclaimer, the term of this patent is extended or adjusted under 35 U.S.C. 154(b) by 0 days.

(21) Appl. No.: 09/355,881

(22) PCT Filed: Feb. 5, 1998

(86) PCT No.: PCT/IB98/00145

§ 371 (c)(1),
(2), (4) Date: Aug. 5, 1999

(87) PCT Pub. No.: WO98/36556

PCT Pub. Date: Aug. 20, 1998

(30) Foreign Application Priority Data

Feb. 13, 1997 (CH) ................................................. 316/97

(51) Int. Cl.⁷ ............................................... G06K 15/00
(52) U.S. Cl. ..................... 358/1.15; 358/1.13
(58) Field of Search .......................... 358/1.1, 1.6, 2.1, 358/1.13, 1.15, 1.18; 707/201, 203, 204, 205, 100, 102, 514, 517; 710/72, 73, 74, 65

(56) References Cited

U.S. PATENT DOCUMENTS

| 4,960,993 A | 10/1990 | Shigyo et al. |
| 5,574,533 A | 11/1996 | Itoh |
| 6,330,572 B1 * | 12/2001 | Sitka .......................... 707/205 |

FOREIGN PATENT DOCUMENTS

| EP | 0 478 340 | 4/1992 |
| EP | 0 756 414 | 1/1997 |
| WO | WO 92/05660 | 4/1992 |

* cited by examiner

*Primary Examiner*—Arthur G. Evans
(74) *Attorney, Agent, or Firm*—Young & Thompson

(57) ABSTRACT

A method for processing a digital image to obtain therefrom a photographic print which consists in transmitting a prerecorded image and data related to its processing to a data server connected to a data transmission network. The data server temporarily memorizes the received data. An image processor connected to an image recorder for recording a negative of the image to be processed on the data from the data server, formats them, and supplies to the image recorder the images to be processed preceded by a virtual image, identifying the user, for automatic processing by a standard filmline processor.

8 Claims, No Drawings

METHOD FOR PROCESSING IMAGES AND DEVICE FOR IMPLEMENTING SAME

The present invention is concerned with a method for processing images and, more particularly, with a method enabling the processing of a digitised image in view of obtaining a photographic print therefrom. The invention is also concerned with an installation for carrying out this method.

There are numerous devices such as digital photographic apparatuses or cameras which allow the acquisition of images under a digitised form. The viewing of images thus obtained can be carried out, for example, using a personal computer or a television set equipped with an appropriate reader. A personal computer is perfectly suited for processing such images in order to modify them before their viewing or their dispatching carried out electronically via a network. However, it is often desirable to have such images printed on paper and the peripheral unit for printing out these images is often not of the quality required. Actually, existing ink jet colour printers for example have a resolution of about 300 lines per inch which is inadequate for the restitution of digitised photographic images. By comparison, the resolution which can be obtained through the chemical development of a 35 mm film is of about 2500 lines per inch. Other printing devices such as the dye sublimation printers are restricted in their use to professionals, because of their very high cost. Furthermore, the totally digital processing by these devices implies that the pixels transferred on the paper support all exhibit the same shape, generally square, which induces a << stair stepping effect >> in the final print. The purpose of the present invention is to remedy the above-mentioned drawbacks by providing a method for processing digitised images, which enable the user to obtain a print of a photographic quality from a digitised image stored previously on an appropriate support. This objective is attained through a method which is characterised by the features set forth in claim 1, as well as an installation such as that claimed in claim 6. Other advantages, such as the possibility of processing the images separately or by batches, as well as the integration of the process into a conventional development operation necessitating no human intervention are set forth in the dependent claims and in the following description.

Digitised photographic apparatuses make it possible to generate an image under a digital form, these images being stored in a memory of the apparatus or in a memory card included in such apparatuses. To display the pictures, it is necessary to load these images into an information processing device such as a personal computer or a conventional work station. The loading of the images is carried out by connecting the apparatus to a serial or a parallel port of a personal computer and by storing them in a bulk memory of the computer such as a magnetic disk. This transfer can also be carried out, when the images are stored on a memory cart, via an appropriate cart reader connected to the computer. A connection without a physical support such as the use of an infra-red signal can also be envisaged for this transfer. The images, once stored in the memory of the computer, can be subjected to any processing which may appear as useful before being displayed on the screen of the same. One can mention as a non limiting example, a software which make it possible to aesthetically modify the images or encrypt them, should the need arise.

The images which one may want to process can also be generated by other devices, such as for example images generated by a scanner or any other device which can digitise an image. The method object of the present invention comprises a series of steps which make it possible for the user to obtain a conventional photographic print from digitised images. This method will, in the first instance, be described in relation with the operations that the user must carry out. The digitised image to be processed must be stored beforehand in the memory of a computer provided with communication means. These communication means can be any conventional means, such as a modem, a digital interface cart or centralised means accessible via a local network for example. The image memorised as a file on the hard disk of the computer can be modified or improved beforehand by a software for processing images, to obtain the final image. When the user wishes to obtain a photographic print of the image, he will first use communication means to call and establish a communication with an information server. It is to be noted that this information server provided with a conventional data processing system can be located anywhere. In a preferred embodiment of the method, the information server will be a machine connected to the INTERNET network, which offers the advantage of providing an easy access at quite a moderate cost. The information server can be accessed in other versions via other communication systems, such as for example rented lines, a packet-switching public network or any other means enabling the transfer of digital data.

Once the communication has been established, the information server will request the user to introduce via a data acquisition programme the information necessary for the processing of his request. In the case of the communication being established via INTERNET, the techniques known under the name of <<active x>> or <<plug in>> can be used. These techniques consist in downloading the software or software portions enabling the acquisition and the processing of a request. This downloading is carried out at the time when the user establishes a session with the information server and when the latter determines that the software necessary is not available in the local computer.

The data considered are comprised of, on the one hand, data enabling the identification of the user, such as his name, his address and optionally information concerning the mode of payment envisaged and, on the other hand, information concerning the image to be processed. This information will include, in particular, the name of the file containing the image, the number and the size of the prints desired, as well as the quality of the paper to be used. This information is similar to that borne by the envelopes used for sending films by the post to a film-developing laboratory.

When the user accesses to the page concerned with the information server, the latter will first propose to the user a list of film-developing laboratories which are equipped for dealing with such requests. Once the film-developing laboratory has been selected by the user, the information server invites the user to introduce the parameters necessary for processing his request.

After validation of the data input, the operations that the user needs to carry out are terminated. He will receive later from the film-developing laboratory the number of prints he has ordered.

In another version, the request for processing can be made locally, i.e. prior to the establishment of a communication with the information server. In this case, the input of the information to be transmitted is carried out by means of a data acquisition programme of the user's computer, which could be, for instance, provided by the film-developing laboratory or be accessible by downloading througth the network. Once the request has been formatted, it is transferred to the information server via the communication means.

The operations which follow are carried out by the information server. When the information arriving from the user is received by the information server, the latter will format the request for processing which will generally be comprised of a header including data concerning the user as well as the above-mentioned processing parameters. This header is followed by data representing the image to be processed. These data are preferably in a standard format used for describing an image, such as the JPEG or the TIFF format for example. This request, once formatted, is stored in the memory of the information server in a space reserved for the processing laboratory chosen by the user.

In another version, the user does not chose the processing laboratory to which he wishes to entrust the development of the images. The information server compares the data concerning the user with those available from a local data base and determines himself the film-developing laboratory located geographically the closest to the user and capable of providing the services required.

In order to process this type of request, the film-developing laboratory must be equipped with the following hardware and software A conventional computer provided with communication means which will be designated in the following description by the term <<image processor>>. This <<image processor>> is connected to an image recording device>> or a <<film recorder>>, i.e. an apparatus receiving as an input a digitised image and producing at the output, through the exposure to light of a photosensitive film, a negative image of this image. The negative images thus obtained are thereafter processed in a conventional manner in the laboratory to obtain the prints desired. The image processor incorporates programmes which enable it to control the image recording device as well as the software necessary for the transfer of digital data from the information server via a network or directly from the user's computer.

The image processor is provided with the programmes and interfaces necessary for the proper execution of the steps described here-after. The software provided is construed in such a manner that the following operations may proceed in parallel on the same and single computer (CPU) or, conversely, on several distributed computers. The latter can be distributed in a single machine or in several interconnected machines. When these functions are carried out on a single computer, one will preferably chose an operating system of the so-called multi-task or multi-process type such as UNIX or WINDOWS NT (registered trademarks).

One of the tasks of the image processor is, via a <<polling system >> to interrogate the information sender, at predetermined intervals of time, in order to determine whether a request for processing is in the-waiting. Should this be the case, the image processor will download the data transferred by the user. When this transfer is completed, the image processor stores temporarily in its memory a copy of the request for processing, i.e. the image to be processed as well as the information which make it possible to identify the originator. Once this data transfer is completed, the image processor acknowledges that the transfer was carried out properly, which enables the information server to delete, if desired, the copy of the information stored. The next step carried out by the image processor consists in analysing the data received. Concerning the image to be processed, the processor determines the format of the image and formats the same into a format acceptable to the image recording device. This format conversion, which can be accompanied by a decompression of the image, is carried out entirely through mathematical operations via an appropriate software and can, accordingly, be adapted to new formats of image coding which could appear on the market. When the conversion operations and formatting operations of the image are completed, the image processor processes the information enabling it to identify the originator. This processing is carried out, for example, by comparing the data received with those stored in the customers data base previously recorded in the image processor. If the customer is not known, he is simply added to the data base. Conversely, if the customermer is already known, the image processor can carry out other verifications, such as the validation of the accounting information concerning this user.

The following step or task consists in generating, from the data transmitted by the user, a digitised virtual image which is intended to be recorded on a photo-sensitive support of the image recording device. This image is provided as a bar code, carrying the information identifying the user as well as the processing desired (type of paper, number of prints, etc.). In a way similar to the manual processing of rolls, the image generated corresponds to, the portion linking conventionally together two rolls of film, for enabling their automatic processing by a development installation. The image can include, for example, a single or an incremental order number, which, in relation with the information contained in the customer's data base, makes it possible to place automatically into envelopes the photographs obtained at the end of the processing operation in the laboratory.

In the case of a manual processing of films for their development, the operator links together the rolls of film received by means of a connector provided generally as a strip of plastic material carrying a bar code and including adhesive edges for enabling their fastening to the ends of the two film rolls. The films, once assembled via this connector, are mounted on a supply unit which feeds the automatic development installation.

The image generated by the image processor corresponds in all aspects to the physical connector used in the manual processing of films being developed. The advantage of generating this image and of recording the same by means of the image recording device resides mainly in the fact that this requires no human intervention. It is thus possible to generate automatically a train of negative films ready for processing, even if for one given user there are only a few if not just one image to be developed.

The following step consists in transferring the virtual image followed by the images to be processed towards the image recording device which will produce through light exposure of a photo-sensitive film a train of negative films headed by a connector and ready for processing in the development installation.

The different steps of the method, namely the transfer of information from the information server, the analysis and the formatting of the data received, the generation of a virtual image corresponding to the connector and the subjecting of the data to the image recording device can be carried out asynchronously, certain steps needing more time than others, depending on the processing capacity of the different components of which the image processor is comprised. There is then provided in the image processor, a temporary storage means for the information during processing. It may actually happen that the task of transferring the data from the information server can be carried out very rapidly, whereas that of transferring the formatted data to the image recording device cannot be done at the same high speed. In this case, the data will de stored temporarily in the image processor so that the sequence of operations may be carried out properly.

For reasons of security, the system can be made redundant by organising it in such a manner that at each point of time in the transmission sequence, at least two copies of the data to be processed be available.

In other versions of the method described here-above, other information exchanges can be carried out between the different computers. One can mention, for instance, the sending of an acknowledgement to the user from the information server, when the latter has transferred the image to be treated to the image processor. This acknowledgement can be provided, in particular, as an electronic mail dispatched to the user.

One will also note that, in the method described, the information server acts simply as a relay and a temporary storage for the images to be processed. This information server can be deleted, in which case the user establishes a communication directly with the image processor situated in the development laboratory. The data which were transmitted to the information server are now transferred directly to the image processor. However, in the case of a direct transfer, the user must know the location (electronic address, telephone number, etc.) of the image processor. If the information server is used and connected to INTERNET, one only needs to know the domain name situation (DNS) of this machine to access to its service.

The data transmitted between the user and the information server or between the latter and the image processor can be encrypted when confidentiality is required. Preferably, one will select an encryption system with a public key. It is to be noted that it is not necessary, in most cases, to encrypt the totality of the data. It may suffice, for example, to encrypt the header of the request (the data relating to the user) for ensuring some basic security without impairing the efficiency of the system. If one wishes an improved standard of confidentiality and if it becomes necessary to encrypt the image itself, one has the choice between two alternatives. The first one consist in encrypting the totality of the image. The second one consists in encrypting only a portion of the image. Actually, a number of standard formats used for recording an image (such as the format JPEG for instance) have at the beginning of the file a series of mapping tables which describe the organisation of the remainder of the file. It is hence possible to encrypt only the mapping tables. It will then become impossible to reconstitute the image without having the encryption key. It should be further noted that these encryption operations can be carried out in several different mariners. The data can be encrypted in a local mode, i.e. before being transmitted via the network and decrypted by the receiver (the image processor). It is also possible to envisage a dynamic encryption which is carried out at the time of the transmission of the data.

The installation necessary for carrying out the method object of the invention includes the following components: at the user end, a device for processing information, such as a personal computer, provided with communication means. The information server, which is optional as was already described, includes a computer provided with communication means as well as a the software necessary for receiving information and transferring digital data. At the other end of the chain, the development laboratory must be equipped with an image processor which is comprised of a conventional computer provided with communication means. The image processor is connected to an image recording device. The image processor is provided with the software necessary for establishing a communication followed by a data transfer from the information server or the customer. Finally, the drivers necessary for driving the image recording device will also be installed on the image processor.

This processing method of a digitised image it extremely adaptable and simple to practice by the user, since the latter receives guidance concerning the information to be transferred once a communication has been established with the information server. As to the laboratory, this method enables the requests to be processed automatically and to produce without any human intervention a train of negative films spaced apart by information relating to the originator and ready to be processed in a conventional installation for developing photographic films.

What is claimed is:

1. A method for processing a digitised image in view of processing the same in an automatic installation for developing photographic films, including the following steps of:

a) preparing a request for processing including information concerning the image to be processed as well as data enabling an identification of the user;

b) transmitting the request for processing to an image processor; and of c) storing in a memory and processing the request by the image processor; characterised in that a virtual image identifying the user as well as the processing desired is generated in the memory of the image processor, this virtual image as well as the images to be developed being subsequently recorded on a photo-sensitive support via an image recording device connected to the image processor.

2. A method according to claim 1, characterised in that the transmission of the request for processing from the user to the image processor is carried out via an information server which stores the digital data temporarily in a memory, the image processor interrogating at variable intervals of time said information server on the presence of a request for processing, in order to carry out a downloading if required.

3. A method according to claim 1, characterised in that the image processor acknowledges the reception of a request for processing from the user by sending an electronic message.

4. A method according to claim 1, characterised in that the data transmitted are compressed before being transferred and decompressed after their reception.

5. A method according to one claim 1, characterised in that the data are encrypted during their transfer.

6. An installation for carrying out the method according to claim 1, characterised in that it includes an image processor comprised of a computer provided with communication means, an image recording device connected and driven by the image processor, as well as at least one computer provided with communication means.

7. An installation according to claim 6, characterised in that it includes at least one intermediate information server, which makes it possible to store in a memory the data received from the user and to transmit the same to the image processor.

8. An installation for developing photographs, characterised in that it includes a device according to claim 6.

* * * * *